(12) United States Patent
Wang et al.

(10) Patent No.: US 10,198,133 B2
(45) Date of Patent: Feb. 5, 2019

(54) INFLECTION BASED CALIBRATION METHOD FOR FORCE DETECTOR

(71) Applicant: SYNAPTICS INCORPORATED, San Jose, CA (US)

(72) Inventors: Ying Wang, Fremont, CA (US); Igor Polishchuk, Fremont, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 50 days.

(21) Appl. No.: 15/083,187

(22) Filed: Mar. 28, 2016

(65) Prior Publication Data

US 2017/0277294 A1 Sep. 28, 2017

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ....................................................... G06F 3/044
See application file for complete search history.

(56) References Cited

U.S. PATENT DOCUMENTS

| | | | |
|---|---|---|---|
| 6,472,777 B1 | 10/2002 | Teng et al. | |
| 7,158,122 B2 | 1/2007 | Roberts | |
| 7,246,513 B2 | 7/2007 | Cumpson | |
| 7,681,432 B2 | 3/2010 | Hay et al. | |
| 7,784,366 B2 | 8/2010 | Daverman et al. | |
| 8,266,971 B1 * | 9/2012 | Jones ...................... | G01L 1/146 73/862.046 |
| 8,768,560 B2 | 7/2014 | Willis | |
| 9,024,907 B2 | 5/2015 | Bolender | |
| 9,057,653 B2 | 6/2015 | Schediwy et al. | |
| 9,164,605 B1 | 10/2015 | Pirogov et al. | |
| 2002/0158637 A1 | 10/2002 | Warmack et al. | |
| 2007/0052690 A1 | 3/2007 | Roberts | |
| 2007/0229464 A1 | 10/2007 | Hotelling et al. | |
| 2011/0227872 A1 * | 9/2011 | Huska ...................... | G06F 3/016 345/174 |
| 2012/0319987 A1 | 12/2012 | Woo | |
| 2012/0327025 A1 | 12/2012 | Huska et al. | |
| 2013/0039507 A1 * | 2/2013 | Park .................... | G10K 11/1788 381/71.6 |
| 2013/0067984 A1 | 3/2013 | Balachandran et al. | |
| 2013/0073142 A1 | 3/2013 | Hergesheimer et al. | |
| 2013/0103794 A1 | 4/2013 | Starkey | |
| 2013/0106794 A1 | 5/2013 | Logan et al. | |

(Continued)

FOREIGN PATENT DOCUMENTS

WO 2015080696 A1 6/2015

*Primary Examiner* — Olga V Merkoulova
(74) *Attorney, Agent, or Firm* — Paradice and Li LLP

(57) ABSTRACT

Embodiments described herein include a method for calibrating capacitive force sensors. The method includes acquiring a plurality of changes of capacitance at a plurality of sensor electrodes in a capacitive sensor, where the plurality of changes of capacitance represents a force. The method also includes identifying a plurality of inflection points in the plurality of changes of capacitance, where each of the plurality of inflection points bounds a region of modeling. The method includes determining a modeling equation for each region of modeling, where the modeling equations are used for calibration of force sensing.

20 Claims, 9 Drawing Sheets

(56) References Cited

U.S. PATENT DOCUMENTS

2014/0085213 A1    3/2014  Huppi et al.
2014/0345358 A1  11/2014  White et al.
2016/0209984 A1*  7/2016  Richards ............... G06F 3/0418
2016/0378255 A1* 12/2016  Butler .................... G01L 1/146
                                                    345/174

* cited by examiner

INFLECTION BASED CALIBRATION METHOD FOR FORCE DETECTOR

BACKGROUND

Field of the Disclosure

Embodiments of the present invention generally relate to a method and apparatus for touch sensing, and more specifically, to processing a received signal.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments described herein include a method for operating an input device that includes acquiring a plurality of changes of capacitance at a plurality of sensor electrodes in a capacitive sensor, where the plurality of changes of capacitance represents a force. The method also includes identifying a plurality of inflection points in the plurality of changes of capacitance, where each of the plurality of inflection points bounds a region of modeling. The method also includes determining a modeling equation for each region of modeling, where the modeling equations are used for calibration of force sensing.

In another embodiment, a processing system for a capacitive sensing device includes a touch sensing module configured to acquire a change of capacitance at a plurality of sensor electrodes in a capacitive sensor. The processing system also includes a force sensing module configured to determine a force based on the change of capacitance. The processing system also includes a calibration module configured to identify a plurality of inflection points in the plurality of changes of capacitance, where each of the plurality of inflection points bounds a region of modeling, and further configured to determine a modeling equation for each region of modeling, where the modeling equations are used for calibration of force sensing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
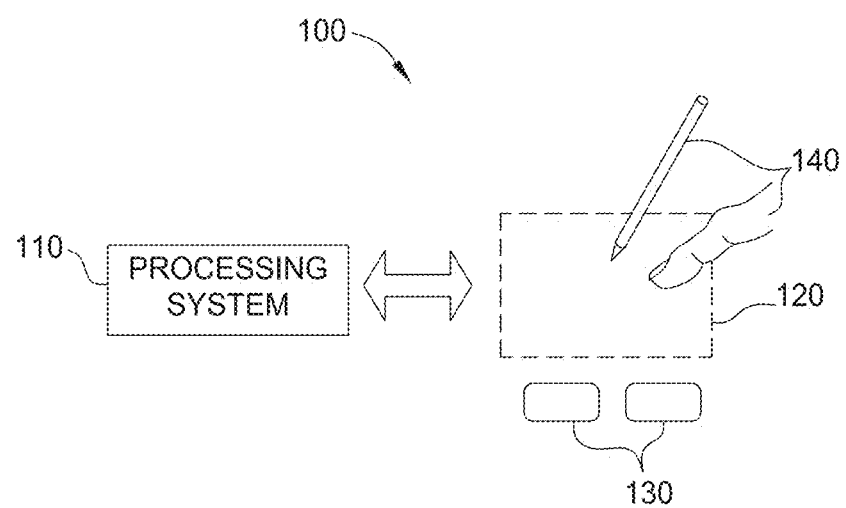
FIG. 1 is a block diagram of a system that includes an input device according to an embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously provide techniques for calibrating a force sensor of a touch device. Some previous solutions would use a large number of calibration points to calibrate the force sensor, which becomes impractical due to the time and processing power required, particularly when large numbers of devices are calibrated. Other previous solutions would use calibration points uniformly spaced on a touch sensor. However, because mechanical bending is different on different parts of a touch sensor, a uniform distribution of calibration points can introduce large errors. Embodiments described herein measure force levels at multiple locations on a touch sensor and then determine inflection points of the force levels on the touch sensor. The inflection points are then used to determine calibration points, which leads to a more accurate force calibration.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
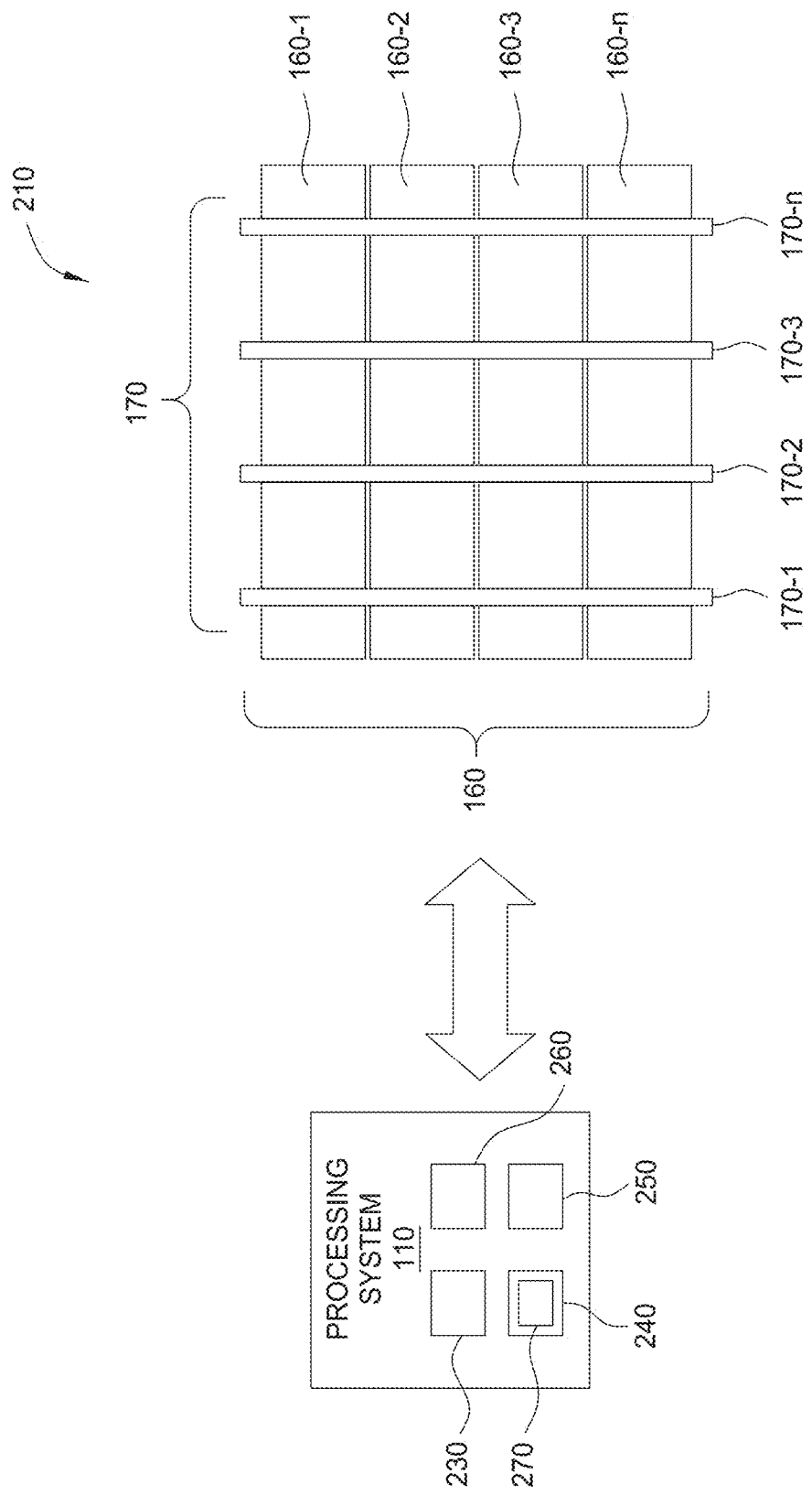
FIG. 2 is an example sensor electrode pattern according to an embodiment.

FIG. 2 illustrates a system 200 including a processing system 110 and a portion of an example sensor electrode pattern configured to sense in a sensing region associated with the pattern, according to some embodiments. For clarity of illustration and description, FIG. 2 shows a pattern of simple rectangles illustrating sensor electrodes, and does not show various components. This sensor electrode pattern comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of sensor electrodes 160.

Although not illustrated in FIG. 2, a separate force sensor can be placed underneath the display screen by disposing force sensing electrodes there. Embodiments described herein may use such a separate force sensor to sense force. In other embodiments, the sensor electrodes as described herein with respect to FIG. 2 are used to sense force.

Sensor electrodes 160 and sensor electrodes 170 are typically ohmically isolated from each other. That is, one or more insulators separate sensor electrodes 160 and sensor electrodes 170 and prevent them from electrically shorting to each other. In some embodiments, sensor electrodes 160 and sensor electrodes 170 are separated by insulative material disposed between them at cross-over areas; in such constructions, the sensor electrodes 160 and/or sensor electrodes 170 may be formed with jumpers connecting different portions of the same electrode. In some embodiments, sensor electrodes 160 and sensor electrodes 170 are separated by one or more layers of insulative material. In some other embodiments, sensor electrodes 160 and sensor electrodes 170 are separated by one or more substrates; for example, they may be disposed on opposite sides of the same substrate, or on different substrates that are laminated together.

In other embodiments, one or more of sensor electrodes 160 or 170 are disposed on the same side or surface of the common substrate and are isolated from each other in the sensing region 120. The sensor electrodes 160 and 170 may be disposed in a matrix array where each sensor electrode may be referred to as a matrix sensor electrode. Each sensor electrode may be substantially similar in size and/or shape. In one embodiment, one or more of sensor electrodes of the matrix array of sensor electrodes 160 and 170 may vary in at least one of size and shape. Each sensor electrode of the matrix array may correspond to a pixel of a capacitive image. Further, two or more sensor electrodes of the matrix array may correspond to a pixel of a capacitive image. In various embodiments, each sensor electrode of the matrix array may be coupled to a separate capacitive routing trace of a plurality of capacitive routing traces. In various embodiments, the sensor electrodes 160 or 170 comprise one or more grid electrodes disposed between at least two sensor electrodes. The grid electrode and at least one sensor electrode may be disposed on a common side of a substrate, different sides of a common substrate and/or on different substrates. In one or more embodiments, the sensor electrodes and the grid electrode(s) may encompass an entire voltage electrode of a display device. Although the sensor electrodes may be electrically isolated on the substrate, the electrodes may be coupled together outside of the sensing region 120—e.g., in a connection region. In one embodiment, a floating electrode may be disposed between the grid electrode and the sensor electrodes. In one particular embodiment, the floating electrode, the grid electrode and the sensor electrode comprise the entirety of a common electrode of a display device.

The areas of localized capacitive coupling between sensor electrodes 160 and sensor electrodes 170 may be termed "capacitive pixels." The capacitive coupling between the sensor electrodes 160 and sensor electrodes 170 change with the proximity and motion of input objects in the sensing region associated with the sensor electrodes 160 and sensor electrodes 170.

In some embodiments, the sensor pattern is "scanned" to determine these capacitive couplings. That is, the sensor electrodes 160 are driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and effectively produce an effectively larger sensor electrode, or these multiple sensor electrodes may transmit different transmitter signals. For example, multiple sensor electrodes may transmit different transmitter signals according to one or more coding schemes that enable their combined effects on the resulting signals of sensor electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, sensor electrodes 160 comprise one or more common electrodes (e.g., "V-com electrode") used in updating the display of the display screen. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each sensor electrode 160 comprises one or more common electrodes. In other embodiments, at least two sensor electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g., combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Processing system 110 may include a driver module 230, a sensor module 240, a determination module 250, and an optional memory 260. The processing system 110 is coupled to sensor electrodes 170 and sensor electrodes 160 through a plurality of conductive routing traces (not shown in FIG. 2).

The sensor module 240, which includes sensor circuitry, is coupled to the plurality of sensor electrodes 170 and configured to receive resulting signals indicative of input (or lack of input) in the sensing region 120 and/or of environmental interference. The sensor module 240 may also be configured to pass the resulting signals to the determination module 250 for determining the presence of an input object and/or to the optional memory 260 for storage. Sensor module 240 may also drive sensor electrodes. In various embodiments, the IC of the processing system 110 may be coupled to drivers for driving the sensor electrodes 160. The drivers may be fabricated using thin-film-transistors (TFT) and may comprise switches, combinatorial logic, multiplexers, and other selection and control logic.

The driver module 230, which includes driver circuitry, included in the processing system 110 may be configured for updating images on the display screen of a display device (not shown). For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

The processing system 110 may be implemented with one or more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements. In embodiments where there is more than one IC of the processing system 110, communications between separate processing system ICs may be achieved through a synchronization mechanism, which sequences the signals provided to the sensor electrodes 160. Alternatively the synchronization mechanism may be internal to any one of the ICs.

Processing system 110 may also comprise a receiver 270 that interfaces sensors to other components. The receiver 270 may comprise an analog front end (AFE) in some embodiments, and will be referred to as AFE 270 in this example embodiment for convenience. Other receiver implementations may be used in other embodiments. The AFE 270 may be embodied in sensor module 240 or in one or more other components of processing system 110.

Embodiments described herein provide techniques for calibrating force detection on a touch device. When a known force is applied to a touch sensor, different parts of the touch sensor detect a different force level due to bending of the sensor and other mechanical effects. To make the force level uniform at different locations on the touch sensor, position compensation is introduced to calibrate the device. Because every device that is manufactured may have slight mechanical differences from other devices of the same model, each device is calibrated during manufacturing.

In previous solutions, a force level was determined at uniform positions across a touch sensor to generate a lookup table. Linear interpolation between the uniform positions was done to generate the compensation for every position. However, because the force levels vary at different locations on the touch sensor, the linear interpolation can lead to large errors after calibration at some locations on the touch sensor. In another solution, a larger number of uniform positions are used to generate a more accurate lookup table. However, complexity and calibration time are increased when the number of positions increase. Embodiments described herein determine calibration points based on inflection points of the force levels on the touch sensor. Inflection-based calibration provides greater accuracy than previous solutions without significantly increasing complexity.

Generally, touch devices of the same model have similar inflection positions because each device in the model line has the same hardware design. Some fluctuations may occur, however, due to manufacturing tolerances, minor differences in materials, or other mechanical variations.

Figure 3:
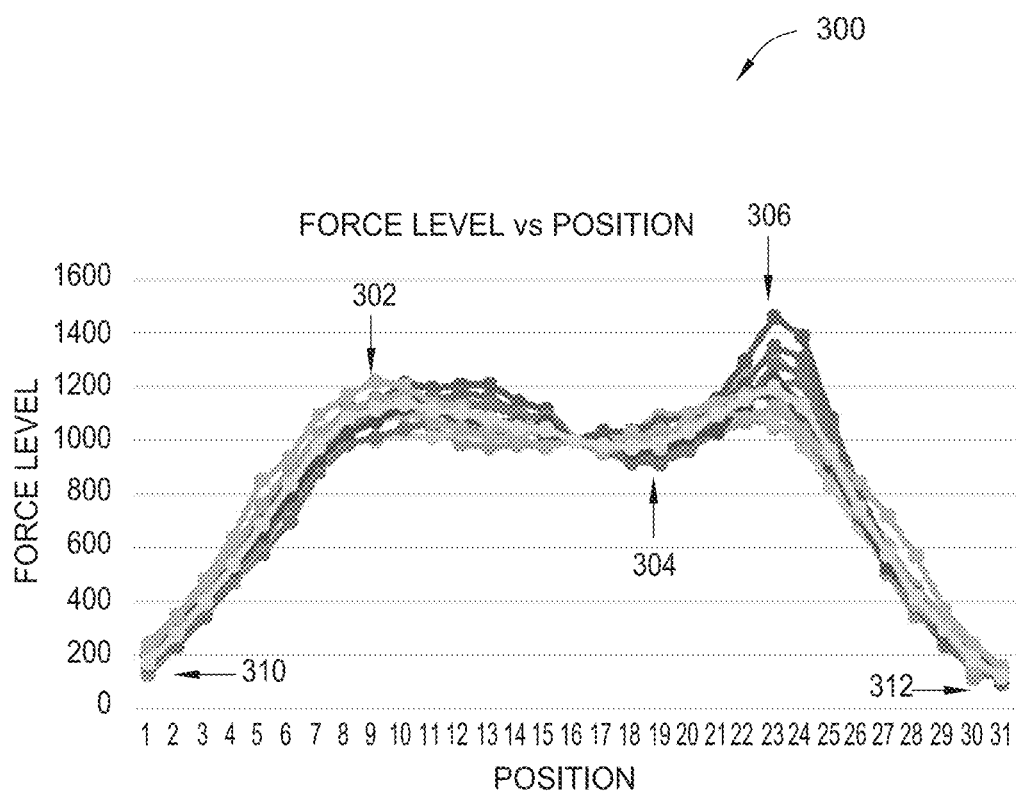
FIG. 3 illustrates an example graph of force level versus position along a long axis of a touch sensor.

FIG. 3 illustrates an example graph 300 of force level versus position along a long axis of a touch sensor. Touch sensor electrodes are arranged in a grid of rows and columns, as discussed above. The position along the long axis of the touch sensor is illustrated on the x-axis of graph 300. A plurality of known forces is applied on the touch sensor, and the force level is measured at each electrode (illustrated on the y-axis of graph 300). As an example, the plurality of known forces is applied along each long axis. As shown in FIG. 3, 31 known forces are applied, one at each position denoted on the x-axis, and force measurements are taken. A "force level" is a calculation based on these force measurements, such as the sum of all force electrodes on that axis, the peak force level at any force electrode, etc. The force level calculated for each row of electrodes is illustrated on graph 300 as a separate curve on the graph. The curves for each row are normalized, as can be seen on graph 300 (each of the curves meets at position 16, force level 1000). After normalization, it can be seen in graph 300 that the curves for each row have roughly similar shapes.

The position of the inflection points of the force curve can be determined from graph 300. Inflection points occur where the derivative (or slope) of the curve changes signs. Another way to describe the inflection points are the peaks and valleys in the curve. A first inflection point 302 is located near position 9 on the x-axis. In the region between positions 1 and 9, the curve steadily rises. At position 9, the curve begins to move downward. The curve continues downward until the second inflection point 304, near position 18. In the region between positions 9 and 18, the curve slopes downward.

A third inflection point 306 is located at position 23. Between positions 18 and 23, the curve slopes upward. At position 23, the curve begins to slope downward. The curve slopes downward in the region between positions 23 and 31.

Position 1 is labeled point 310 and position 31 is labeled point 312 in this example. Although points 310 and 312 are not inflection points, these points are also used as calibration points in some embodiments. These points are near the edges of the touch sensor and are useful for calibration adjustments near the edges. Other positions near the edges, such as positions 2 and 30, may be used instead of, or in addition to, positions 1 and 31 in some embodiments to provide greater accuracy, depending on the specific characteristics of the device being calibrated.

In the example described above, five calibration points along the long axis have been identified, located at positions 1, 9, 18, 23, and 31. These points can be used in conjunction with calibration points along the short axis, determined in a similar manner, to provide x and y coordinate positions for calibration points on a touch sensor.

In some embodiments, force curves from different devices may be used to determine inflection points. A plurality of changes of capacitance is acquired from a plurality of devices of a same model. The changes of capacitance represent force measurements, and the force curves from the different devices are normalized and plotted on a graph. Then, inflection points are determined as described with respect to FIGS. 3 and 4. Using force curves from different devices may smooth out any variations across devices of a specific model.

Figure 4:
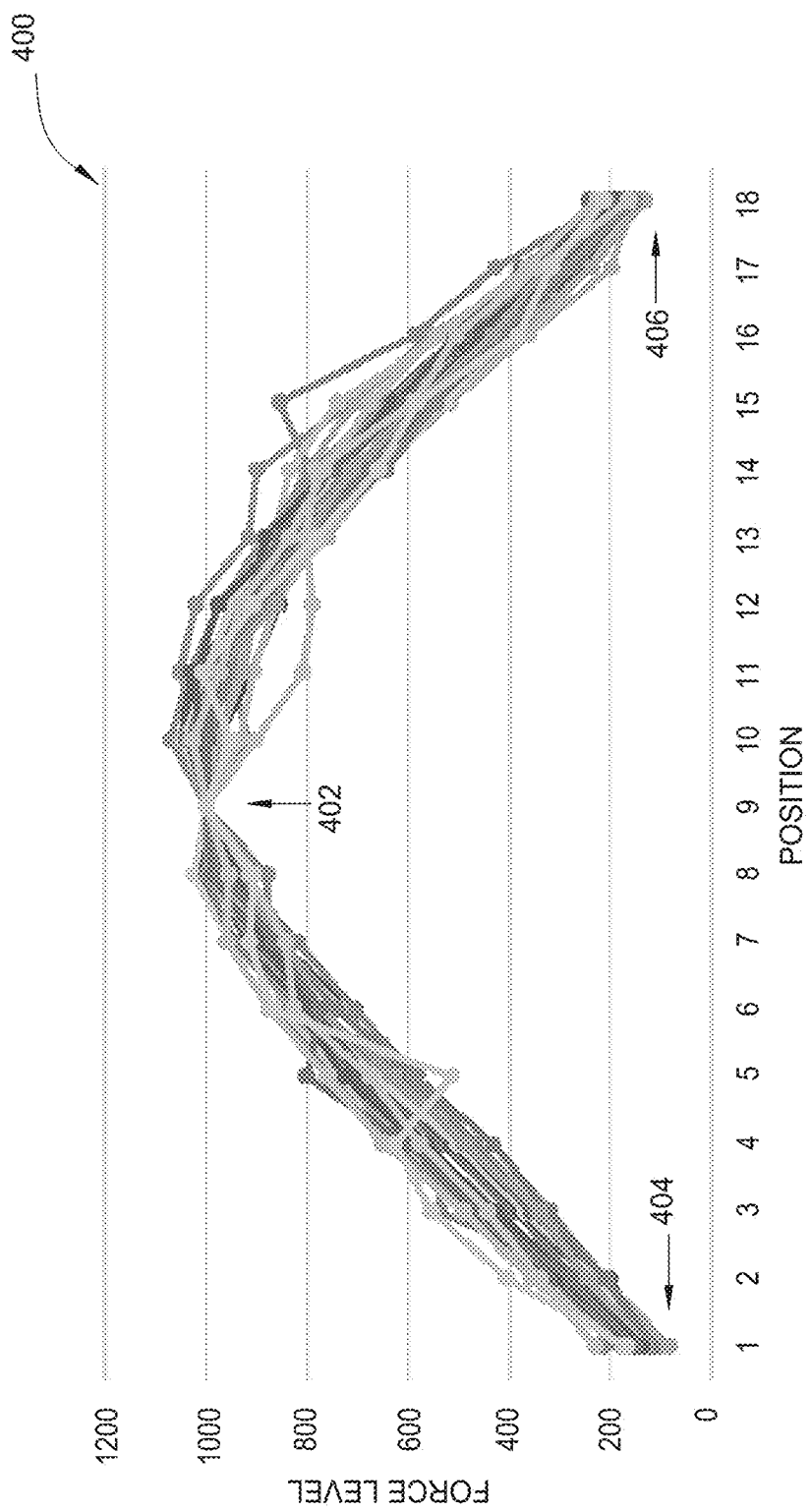
FIG. 4 illustrates an example graph of force level versus position along a short axis of a touch sensor.

FIG. 4 illustrates an example graph 400 of force level versus position along a short axis of a touch sensor. As described above with respect to FIG. 3, a plurality of known forces is applied on the touch sensor, and the force level is measured at each sensor electrode (illustrated on the y-axis of graph 400). The position along the short axis of the touch sensor is illustrated on the x-axis of graph 400. The force level measured or calculated for each column of electrodes is illustrated on graph 400 as a separate curve on the graph. The curves for each column are normalized, as can be seen on graph 400 (each of the curves meets at position 9, force level 1000). After normalization, it can be seen in graph 400 that the curves for each column have roughly similar shapes.

The position of the inflection points in FIG. 4 can be determined as they were above with respect to FIG. 3. In graph 400, the only inflection point 402 is located roughly at position 9. The slope of the curve changes signs at position 9. Positions near the edges, such as positions 1 and 18, may be used as other calibration points 404 and 406, respectively. These three calibration points are used with the five calibration points found above with respect to FIG. 3 to determine fifteen x-y coordinates of a touch sensor, illustrated in Table 1 below:

TABLE 1

| 1, 1  | 9, 1  | 18, 1  | 23, 1  | 31, 1  |
| 1, 9  | 9, 9  | 18, 9  | 23, 9  | 31, 9  |
| 1, 18 | 9, 18 | 18, 18 | 23, 18 | 31, 18 |

The coordinates in Table 1 above are used as calibration points to generate a lookup table, which is in turn used to calibrate devices of a similar model. In some embodiments, better results may be obtained by moving the calibration points away from the edges of the touch sensor. Instead of using position 1, use position 3 for both the row and column. Instead of using position 18 as determined in FIG. 4, use position 16. Finally, instead of using position 31 as determined in FIG. 3, use position 29. Using these adjustments, the calibration points look like the points in Table 2 below:

TABLE 2

| 3, 3  | 9, 3  | 18, 3  | 23, 3  | 29, 3  |
| 3, 9  | 9, 9  | 18, 9  | 23, 9  | 29, 9  |
| 3, 16 | 9, 16 | 18, 16 | 23, 16 | 29, 16 |

Force sensor calibration is performed based on those fifteen x-y coordinates in Table 2. As mentioned above, it is too costly and time consuming to calibrate a force sensor using hundreds of points, particularly when every phone undergoes calibration during manufacturing. Therefore, a sample of calibration points must be used instead. These fifteen coordinates provide more accurate calibration than previous methods that utilize fifteen uniformly spaced calibration points.

Figure 5:
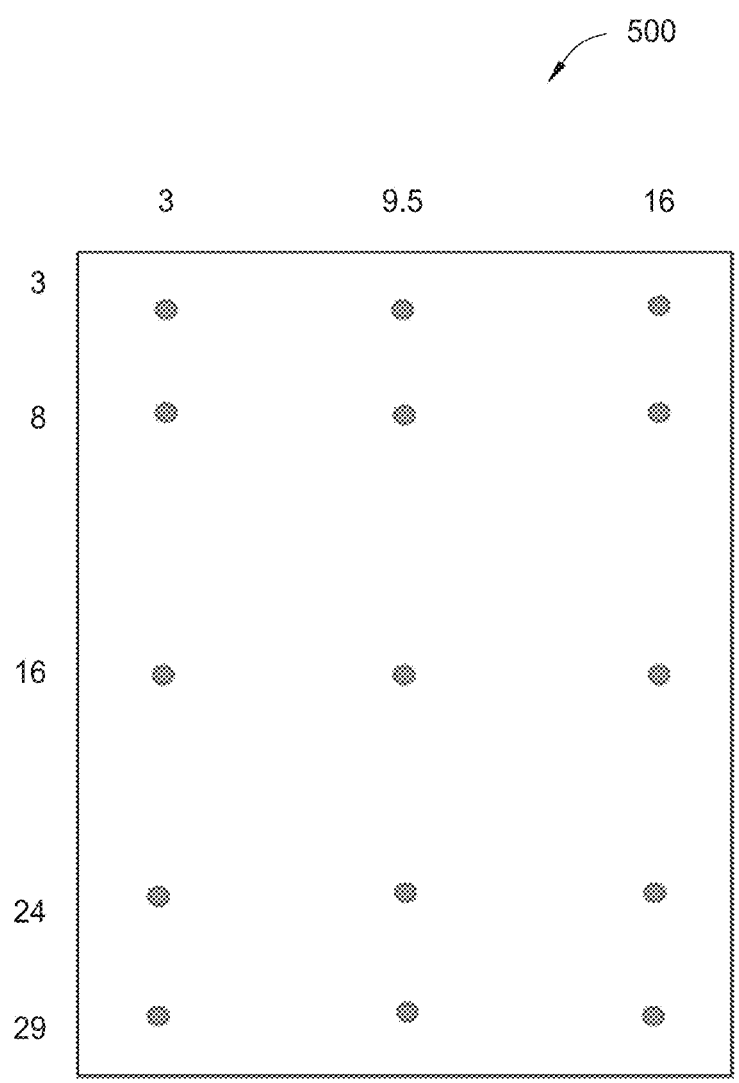
FIG. 5 illustrates non-uniformly distributed calibration points.

An illustration of non-uniformly distributed calibration points is shown in FIG. 5. In FIG. 5, calibration points 500 are shown at positions 3, 9.5, and 16 on the short axis and positions 3, 8, 16, 24, and 29 on the long axis. In this example, these fifteen calibration points are located at inflection points, determined according to the methods described above.

Figure 6:
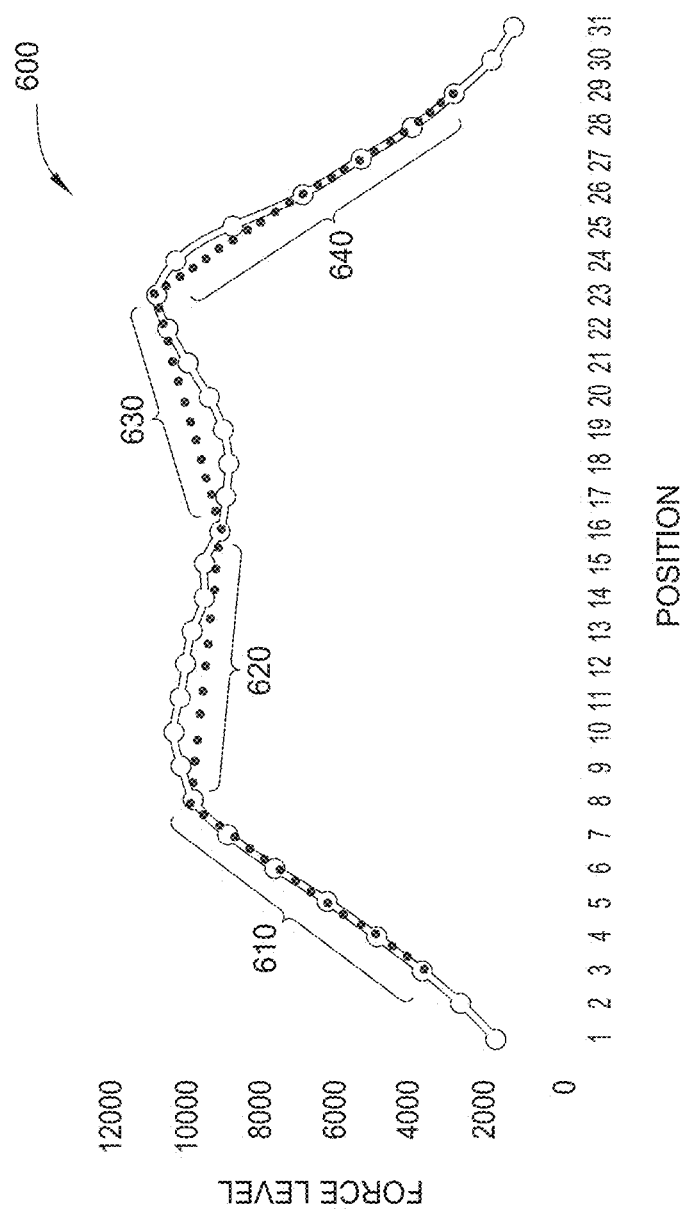
FIG. 6 illustrates a graph of a piecewise linear approximation of the calibration points along the long axis.

FIG. 6 illustrates a graph 600 that shows a piecewise linear approximation of the calibration points along the long axis. The segments (610, 620, 630, and 640) shown in graph 600 provide a linear "best match" for the curve. A goal of this embodiment is to find a piecewise linear approximation of the curve in as few segments as possible. Of course, other embodiments may include additional segments to increase accuracy. The inflection points can be used, along with points near the edges, to create these segments. The segments can be referred to as modeling equations, which denote regions of modeling. The modeling equations are used to generate a lookup table. Linear interpolation is then used to generate a compensation amount for every position on the touch sensor device. Generating compensation amounts using a lookup table generated by the calibration points as described above provides a more accurate calibration than previous methods.

As shown in FIG. 6, segment 610 provides a linear approximation between positions 3 and 8. The region between positions 3 and 8 can thus be modeled as a linear equation, and a lookup table can be generated for the points between positions 3 and 8. Likewise, segment 620 provides a linear approximation between positions 8 and 16. Segment 630 provides a linear approximation between positions 16 and 23, and segment 640 provides a linear approximation between positions 23 and 29. Each of the segments in FIG. 6 denotes a modeling region for a portion of the graph. In other embodiments, the graphs of force versus position may have different shapes and the modeling equations may not necessarily be linear equations. However, more complex modeling equations result in a tradeoff between accuracy and complexity during the calibration process.

Figure 7:
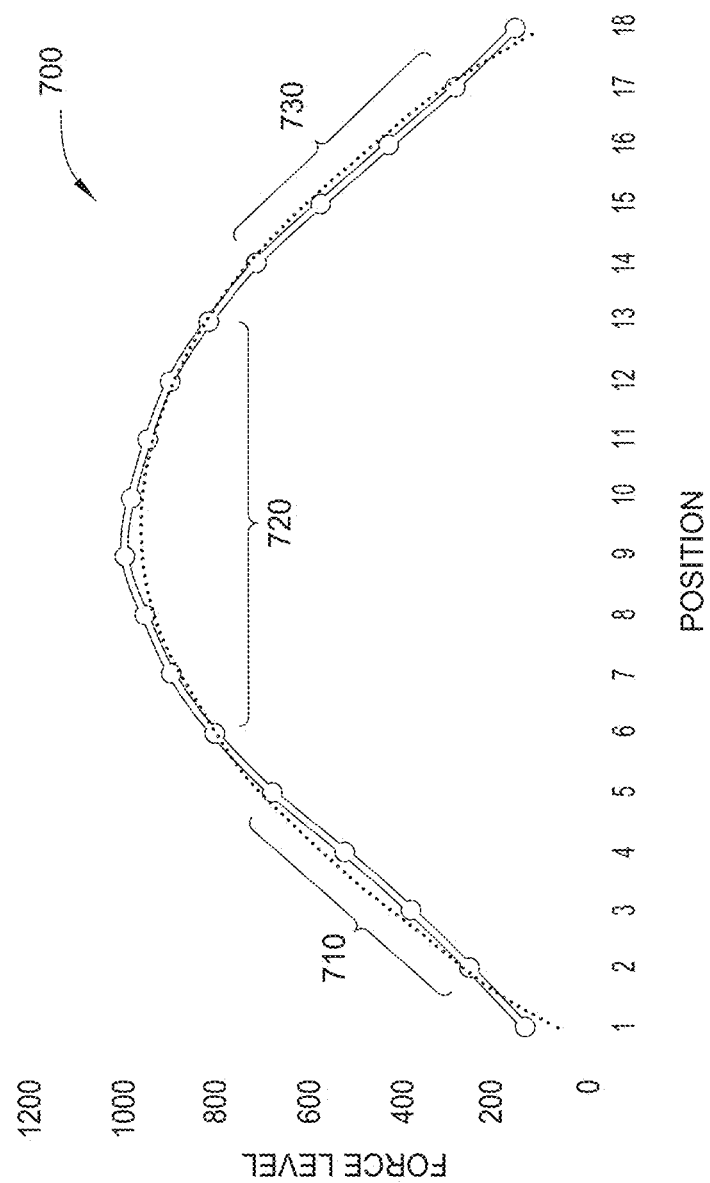
FIG. 7 illustrates a graph of a piecewise linear approximation of the calibration points along the short axis.

FIG. 7 illustrates a graph 700 that shows piecewise approximations of the calibration points along the short axis. The segments (710, 720, and 730) provide a best match for the curve. Segment 710 provides a linear approximation between positions 2 and 5. Segment 730 provides a linear approximation between positions 14 and 17. Segment 720, between points 6 and 13, is similar to a second order polynomial. Therefore, graph 700 can be approximated by using two linear segments and one second order polynomial. Those equations also denote regions of modeling, and are used to generate the lookup table for calibration.

Figure 8:
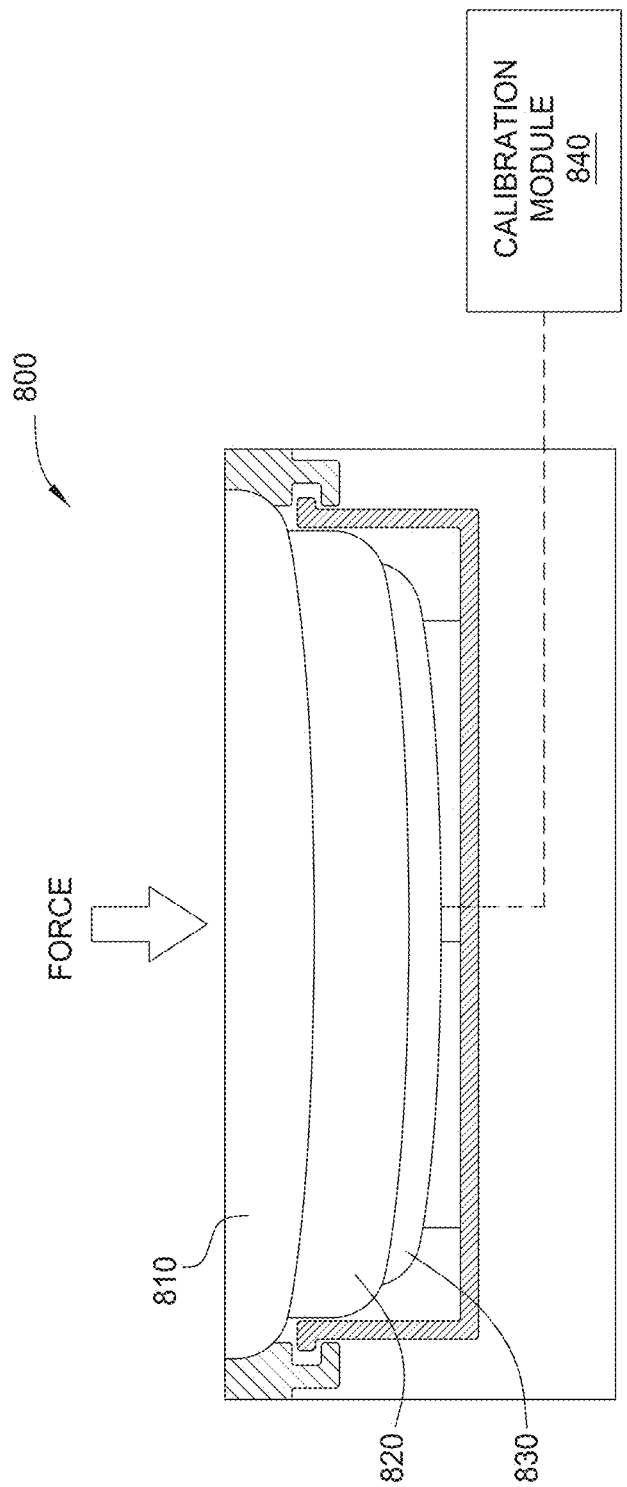
FIG. 8 illustrates an example processing system for calibrating capacitive force sensors.

FIG. 8 illustrates an example processing system 800 for calibrating capacitive force sensors. A force is applied to a touch surface 810 and a touch sensing module 820 acquires a change of capacitance at a plurality of sensor electrodes in a capacitive sensor. The touch sensing module 820 identifies the coordinate location of the force. A force sensing module 830 is configured to determine the amount of force based on a change of capacitance.

The calibration module 840 is configured to implement aspects of the embodiments described herein. Calibration module 840 comprises appropriate circuitry and/or logic to implement these embodiments. Calibration module 840 receives changes of capacitance that represent coordinate locations from the touch sensing module 820 and changes of capacitance that represent force readings from force sensing module 830. Calibration module 840 then identifies a plurality of inflection points from the changes of capacitance. The inflection points bound regions of modeling, as described above. Calibration module 840 is further configured to determine a modeling equation for each region of modeling. The modeling equations may be approximations of a force versus position curve between two calibration points. The modeling equations are used for calibration of force sensing.

In some embodiments, calibration module 840 receives changes of capacitance from multiple devices of the same model and then determines inflection points for force calibration. Once inflection points are determined by calibration module 840, a lookup table can be generated and used for force calibration of a production run of devices of that model.

Figure 9:
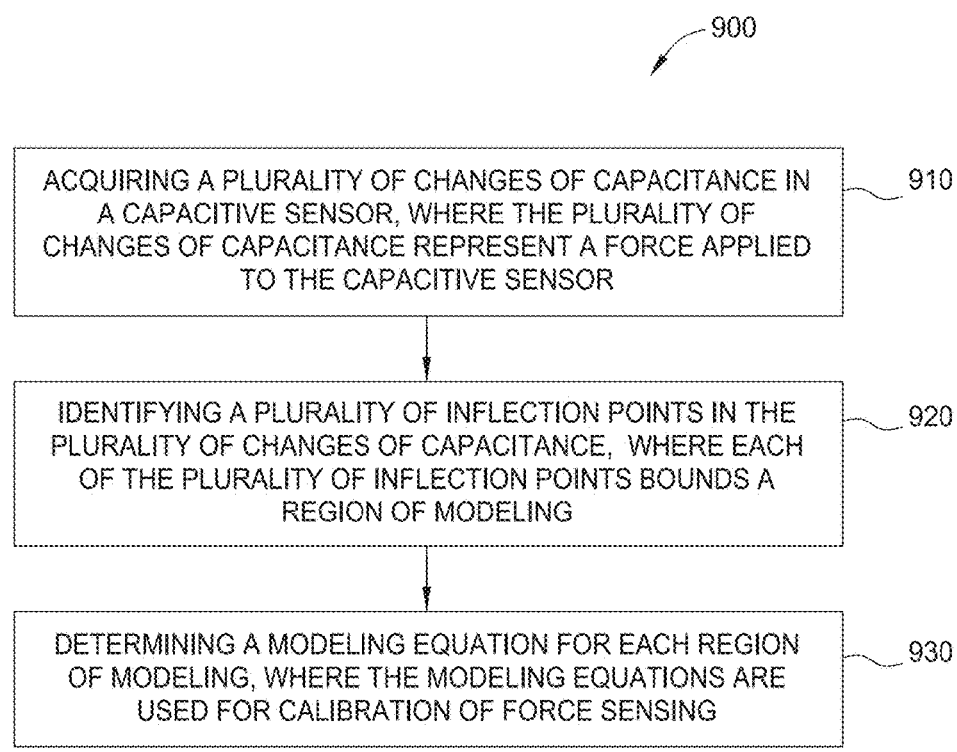
FIG. 9 is a flowchart illustrating a method for calibrating capacitive force sensors.

FIG. 9 is a flow diagram illustrating a method 900 for calibrating capacitive force sensors. Although the method steps are described in conjunction with the systems of FIGS. 1-8, persons skilled in the art will understand that any system configured to perform the method steps, in any feasible order, falls within the scope of the present invention. In various embodiments, the hardware and/or software elements described above in FIGS. 1-8 can be configured to perform the method steps of FIG. 9. In some embodiments, the components illustrated in FIGS. 1-2 and 8, such as the sensor electrodes and calibration module, may perform some or all of the steps in FIG. 9, utilizing hardware and/or software.

The method begins at step 910, where sensor electrodes acquire a plurality of changes of capacitance in a capacitive sensor. The plurality of changes of capacitance represent a force applied to the capacitive sensor.

The method continues at step 920, where a calibration module identifies a plurality of inflection points in the plurality of changes of capacitance. Each of the inflection points bounds a region of modeling. The inflection points indicate a change in sign of the derivative of the changes of capacitance.

The method continues at step 930, where the calibration module determines a modeling equation for each region of modeling. The modeling equations are used for calibration of force sensing. With the modeling equations, a lookup table is generated to provide force compensation for every position of the touch sensor.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

What is claimed is:

1. A method for calibrating a sensor, comprising:
    acquiring changes of capacitance from a plurality of sensor electrodes in response to a plurality of forces applied across a plurality of sensing regions of the sensor, wherein the changes of capacitance form a curve corresponding to the plurality of forces;
    identifying at least two inflection points on the curve, wherein the at least two inflection points bound a first region of the plurality of sensing regions;
    determining a model based on the at least two inflection points, the model representing forces for a plurality of positions in the first region; and
    calibrating the sensor for force sensing using the model.

2. The method of claim 1, wherein the calibrating the sensor for force sensing is to compensate for variations in mechanical aspects of an input device.

3. The method of claim 1, wherein the at least two inflection points correspond to a change in sign of a derivative of the changes of capacitance.

4. The method of claim 1, wherein the positions between the at least two inflection points are not uniformly spaced.

5. The method of claim 1, wherein one or more of the plurality of forces are applied along each axis of the sensor.

6. The method of claim 1, wherein a second region of modeling is bound by a calibration point that is not an inflection point.

7. The method of claim 6, wherein the calibration point that is not an inflection point is a point near an edge of the sensor.

8. The method of claim 6, wherein the second region of modeling includes at least one same inflection point as the first region of modeling.

9. The method of claim 1, wherein the identifying of the at least two inflection points comprises identifying at least one of an upward slope or a downward slope.

10. The method of claim 1, wherein the model is a piecewise linear approximation for the first region of modeling.

11. The method of claim 1, wherein the model is a second order polynomial approximation for the first region of modeling.

12. The method of claim 1, wherein:
    identifying the at least two inflection points comprises identifying measured force levels at a plurality of calibration points.

13. A processing system for calibrating a sensor, comprising:

a sensing module configured to acquire changes of capacitance from a plurality of sensor electrodes in response to a plurality of forces applied across a plurality of sensing regions of the sensor, wherein the changes of capacitance form a curve corresponding to the plurality of forces; and a calibration module configured to identify at least two inflection points on the curve, wherein the at least two inflection points bound a first region of the plurality of sensing regions, and further configured to determine a model based on the at least two inflection points, the model representing forces for a plurality of positions in the first region, and further configured to calibrate the sensor for force sensing using the model.

14. The processing system of claim 13, wherein the using of the model to calibrate the sensor for force sensing is to compensate for variations in mechanical aspects of an input device.

15. The processing system of claim 13, wherein the at least two inflection points correspond to a change in sign of a derivative of the changes of capacitance.

16. The processing system of claim 13, wherein the model is a piecewise linear approximation for the first region of modeling.

17. The processing system of claim 13, wherein one or more of the plurality of forces are applied along each axis of the sensor.

18. The processing system of claim 13, wherein the calibration module determines a second region of modeling bound by a calibration point that is not located at a location of the at least two inflection points.

19. The processing system of claim 13, wherein the calibration module identifies the at least two inflection points by identifying at least one of an upward slope or a downward slope.

20. The processing system of claim 13, wherein:

identifying the at least two inflection points comprises identifying measured force levels at a plurality of calibration points.

* * * * *